Aug. 16, 1932.　　　J. C. PARSONS　　　1,871,911

SHOCK ABSORBER

Filed Oct. 23, 1929　　　3 Sheets-Sheet 1

Inventor:
Jay C. Parsons
By Wallace R. Lane Atty.

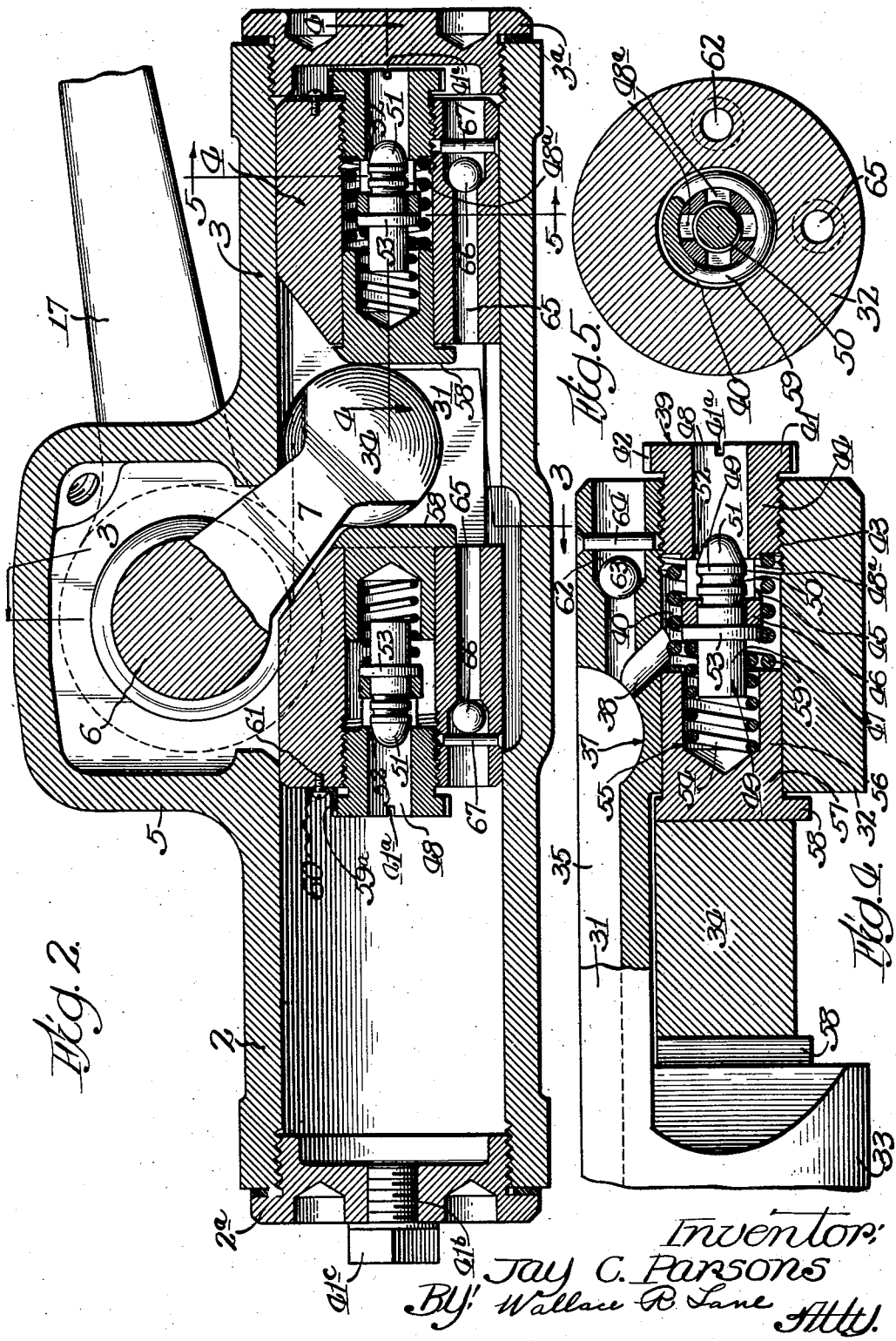

Patented Aug. 16, 1932

1,871,911

UNITED STATES PATENT OFFICE

JAY C. PARSONS, OF CHICAGO, ILLINOIS, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed October 23, 1929. Serial No. 401,740.

The present invention relates to shock absorbing devices and more in particular to those devices adapted for use in vehicles or the like.

Among the objects of the invention is to provide a novel shock absorber or the like having a housing for holding a fluid supply, such as oil, and having therein novel means for the movement of the fluid from one part of the housing to another part thereof for minimizing and checking the movement of two relatively movable members, such as the chassis and axle of a vehicle or other like and similar movable members.

The invention comprehends the provision of novel means movable in a cylinder of the housing, such as a plunger or the like, and having passage means therein for the transferring of the fluidal body from one part of the cylinder to another.

The invention further comprehends the provision of a novel means such as a plunger or the like, movable in the cylinder of the housing and provided with novel passage means for the transferring of a fluidal body from one part of the cylinder to another, the passage means having adjacent one of its ends, novel throttling means for resisting flow of the fluidal body in either direction of movement of the plunger in the cylinder.

Another object of the invention is to provide a novel means in the passage of the movable plunger or the like for resisting the flow of the fluidal body through the plunger passage means from one part to another part of the cylinder in which the plunger moves. Such novel means comprises annular orifice means in the plunger for imposing given resistances to flow of the fluid through the passage means and for varying the relative rates of flow of the fluid in the opposite directions of flow thereof.

A further object of the invention is to provide a novel control means for determining the relative rate of flow or relative resistances to flow of the fluid through the plunger passage means upon movement of the same in opposite directions and having means associated therewith for relieving excessive pressure occurring in the system. The novel control means are provided with resilient means for normally maintaining a given orifice means for the normal determined relative rates of flow or resistances to flow in opposite directions, this resilient means being yieldable to permit a variation in size of the orifice means for decreasing the resistance to flow therethrough of the fluid and for relieving excessive pressure in the system. Such excessive pressures may occur or be built up in the system, as for example, because of the change or variation in the viscosity of the oil or other fluidal body used in the device due to changes of temperature. Fluidal bodies such as oil or the like, which flow substantially freely at temperatures such as 100° F., become less mobile at temperatures of 50° or 60° F. below zero and are slow to yield under the application of forces resulting in excessive pressures being accordingly built up in the cylinders of the shock absorbers.

Excessive pressures might likewise occur in the device because in servicing either through inadvertence or mistake, the cylinders of the shock absorber were filled with an improper fluidal body having a viscosity greater than that recommended and of known viscosity. These excessive pressures are relieved by the novel control means which is adapted to yield under excessive pressures and which may be readily adjusted, as desired, to accommodate the range of viscosity changes which may be encountered.

Another object of the invention is to provide a novel plunger having throttling means adjacent an end of the passage means thereof for resisting movement of a fluid through the same in either direction of movement of the plunger, one of the throttling means having associated therewith control means for determining the relative rates of flow or relative resistances to flow of the fluid through the passage upon movement of the plunger in one direction and having means for relieving excess pressures in the system, the other throttling means providing a substantially constant or uniform orifice for resistance to flow of fluid through the passage means upon movement of the plunger in the opposite direction.

The invention further comprehends the idea of providing means associated with the control and relief means for adjusting the relative rates of flow or relative resistance to flow of the fluid through the orifice means, as likewise for determining the relative pressures to be relieved in the system, means being provided in the cylinder head or heads if desired, to provide ready access thereto for the adjustment thereof.

A further object of the invention is to provide a novel throttling means in the plunger passage for the flow of fluid therethrough without the accompanying noises, such as hissing or the like which heretofore have been incidental to the passage of fluids under pressure as in a shock absorber. The invention comprehends the idea of providing an annular orifice means for the throttling of the flow of the fluid and for preventing or eliminating these objectionable noises, the fluid flowing through the orifice means as a film, whereby it has no chance to gurgle about or form high velocity jets.

Another novel feature of the invention is the provision of novel means carried by the plunger and contacting the operating arm and having means to compensate for wear and to prevent or eliminate loose movement, knocking, pounding, and the like between these members.

The invention further comprehends the idea of providing a plunger or the like having or carrying at one end thereof, novel throttling and control means for determining the relative rates of flow or relative resistances to flow of the fluid through the plunger upon movement thereof in one direction and throttling means for resistance to flow of fluid when moved in the opposite direction, while novel adjustable means are provided at and carried by the other end thereof for maintaining the means for compensating for wear of the operating arm in contact with the same.

Another object of the invention is to provide a novel housing for a shock absorber, this housing being of a single solid or integral structure and having aligned bearings therein. The housing is designed to permit the assembly of the rock shaft and arm as a unit, the arm of the rock shaft being assembled within the housing by way of an opening in one of the bearings.

A still further object of the invention is to provide a novel packing means for a shaft protruding through the housing of a shock absorber, such packing means including suitable means for retaining the same in place as likewise for preventing water, grit or the like from entering into the housing or around the bearing.

Other objects, capabilities, advantages and features are comprehended by the invention as will later appear, and as are inherently possessed thereby.

Referring to the drawings:

Fig. 2 is a longitudinal vertical cross sectional view taken in a plane represented by line 2—2 of the embodiment shown in Fig. 1 of the drawings.

Fig. 4 is a fragmentary longitudinal cross sectional view taken in the plane represented by line 4—4 in Fig. 2 of the drawings.

Fig. 5 is a vertical cross sectional view taken in the planes represented by line 5—5 in Fig. 2 of the drawings.

Figure 1:
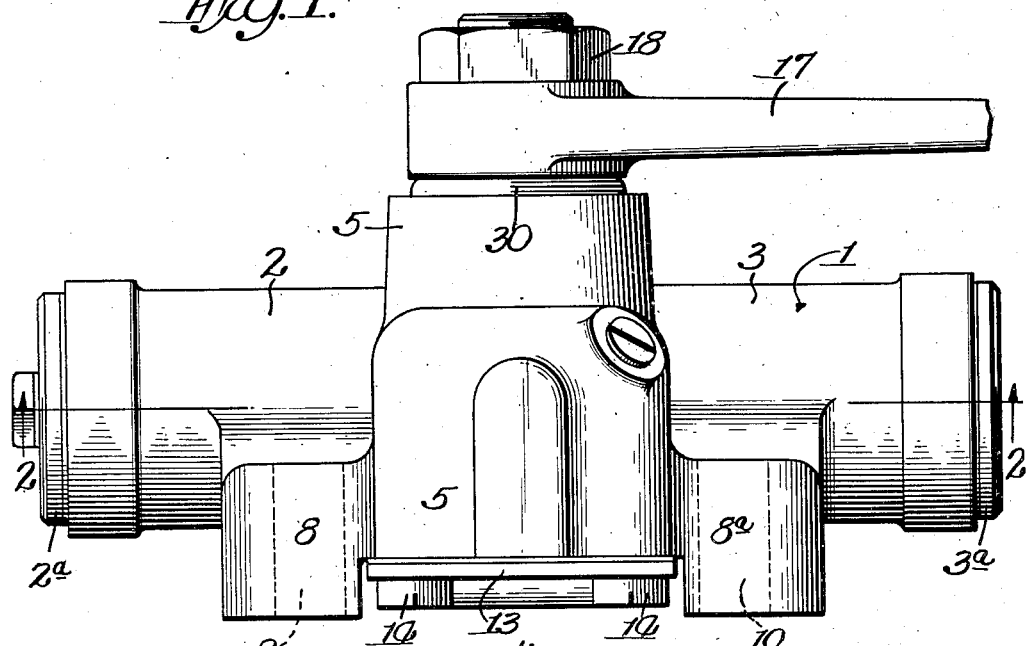
Fig. 1 is a top plan view of an embodiment selected to illustrate the invention.
Figure 3:
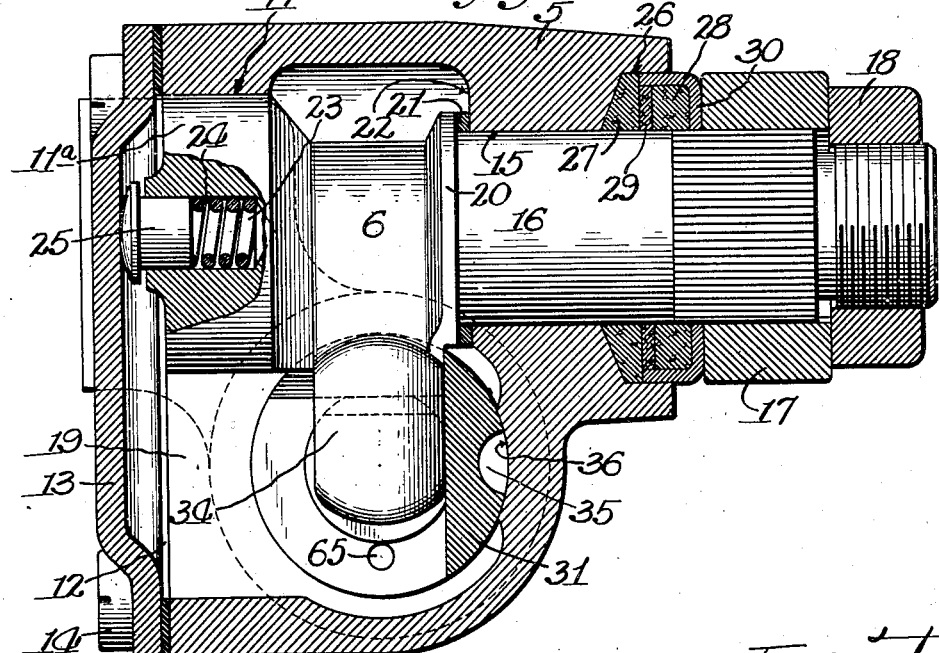
Fig. 3 is a transverse vertical cross sectional view taken in the planes represented by the lines 3—3 of Fig. 2 of the drawings.

Referring now more in detail to the drawings, the embodiment selected to illustrate the invention is shown as comprising a casing or housing 1 having aligned cylinders 2 and 3 in which axially reciprocates a plunger 4, the cylinders having secured to their outer ends closure plates or cylinder heads $2^a$ and $3^a$ which may be screwed to the outer end portions of the cylinders and have suitable packing means therebetween as clearly shown in Fig. 2 of the drawings. This casing is provided with a housing 5 extending laterally from between the cylinders and providing means in its side walls for journalling a shaft 6 having an arm 7 extending from between the journalled parts of the shaft and engaging the plunger 4 for the reciprocation thereof when the shaft 6 is rocked. The housing 5 is provided with flange or lug portions 8 and $8^a$ integral therewith, as likewise with the cylinder walls, these lugs 8 and $8^a$ having openings or bolt holes 9 and 10 for connecting the housing to a chassis member of a vehicle or the like by such means as bolts or other suitable connecting means.

A bearing means 11 for journalling the end $11^a$ of the shaft 6 is provided in one of the walls of the housing 5, this bearing means being adjacent to an opening 12 in the casing 1 and being enclosed therein by a closure cap or member 13 secured to the casing by means of screws 14 or the like, while in the opposite wall of the housing 5 is a bearing means 15 for receiving and journalling the other end 16 of the shaft 6.

The end 16 extends through this bearing opening and is fluted or grooved to receive a similar fluted or grooved opening in the end of a crank arm 17, this crank arm being connected by any suitable means such as a link mechanism (not shown) to the axle of a vehicle or the like, the movement of the axle being transmitted by way of the link mechanism, crank arm 17, shaft 6 and arm 7 to the plunger which absorbs and cushions, by means of suitable fluid in the cylinders 2 and 3, the movement thereof. The end 16 of the shaft 6 is threaded to receive a nut 18 for holding the crank arm 17 upon the shaft.

In order that the casing 1 may be of a single solid casting, as likewise the shaft 6 and extending arm 7, the bearing 11 in the wall of the housing is provided with an opening 19 through which the extending arm 7 may pass when the shaft 6 is axially moved into the housing in the assembling of the absorber.

Inasmuch as the bearing 11 is within the housing 5 no means are necessary for providing a fluid tight joint therearound, but since the end of the shaft 16 protrudes through the bearing 15, the packing means are necessary for effecting a fluid tight joint for preventing leakage of fluid outwardly therethrough and for preventing water, grit or the like from entering between the bearing and shaft. Novel packing means have been provided to accomplish the desired results. The shaft 6 is provided with a shoulder 20 adjacent the inner wall 22 of the bearing opening 15 and having therebetween a gasket 21 adapted to abut the face of the shoulder and wall 22 of the bearing opening. A spring 23 within a bore 24 in the end 11ᵃ of the shaft 6 is provided and is adapted to press against a pin 25 which bears against the plate 13 of the housing to seat and maintain seated the gasket 21 between the shoulder 20 and the wall 22.

At the outer end of the bearing opening 15 is a bore 26 concentric therewith for retaining suitable packing means about the end 16 of the shaft 6. Such packing means comprises an inner and outer washer or gasket 27 and 28 of cork or the like and having therebetween a felt washer or gasket 29, these washers being retained in place and forced against the surface of the end 16 of the shaft 6 by means of a cup-shaped member 30 pressed into the bore 26, this member likewise presenting a surface against which the end of the crank arm 17 may rub, thus preventing wear of the packing means.

The plunger 4 operating in the cylinder casing is provided with a body portion 31 having integral with its ends head portions 32 and 33 of like construction, these heads being spaced apart for the insertion therebetween of a bulbous end 34 of the extending arm 7 of the shaft 6. The extending arm 7, movable or rockable by way of the crank arm 17, operates to cause a movement of the head 32 within the cylinder 3 for compressing a fluid, such as oil or the like therein, while the head 33 is movable within the cylinder 2 for compressing the fluid upon movement of the plunger 4 in the opposite or reverse direction.

A longitudinal groove 35 is provided in the body portion 31 which is slidable on and in contact with a machined surface 36 in the casing 1 which extends between the cylinders 2 and 3, this groove terminating at each end in a bulbous part 37. These bulbous parts 37 of the groove 35 communicate with a passage 38 in each of the head portions which in turn is associated with and leads to throttling means 39 carried in a bore 40 in each of the head portions for throttling and resisting the flow of the fluid from one cylinder to another and through the plunger by way of the passages 38 and groove 35.

Figure 7:
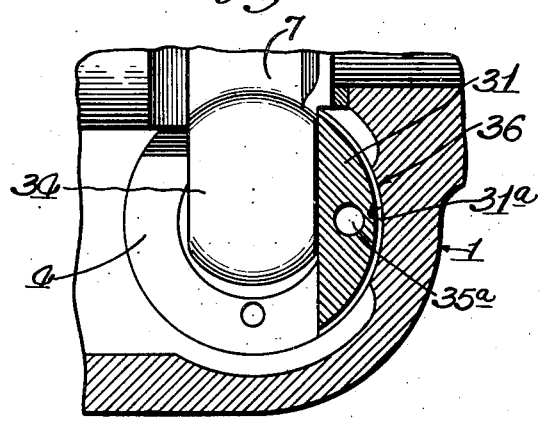
Fig. 7 is a fragmentary vertical cross-sectional view similar to Fig. 3 and disclosing a plunger mounted in the cylinders of the shock absorber and provided with a longitudinal hole for the passage of a fluid therethrough.

If it be desired, the body portion 31 of the plunger 4 may be of the construction shown in Fig. 7 of the drawings wherein this body portion 31 is provided with a longitudinal bore or hole 35ᵃ passing therethrough and communicating with openings or passages 38 to the throttling means 39 for passage of the fluid from one cylinder to the other. In the event that it be desired to use a plunger provided with a longitudinal bore, it is not necessary that the surface of the casing adjacent the plunger and between the cylinders be machined, and preferably the body 31 of the plunger should be spaced therefrom, as clearly shown at 31ᵃ in Fig. 7. The throttling means 39 carried by these head portions are of similar construction and comprise a plug 41 having a serrated head 42 and a threaded shank 44 adapted to engage the threaded end 44 of the bore, this shank having an extension 45. This extension is provided with an annular stop 46 for determining the position of a valve 47 extending within the bore 48 longitudinally passing through the shank 44 and extension 45 of the plug. In the extension 45 and between the shank 44 and annular stop 46 are provided radially extending openings 48ᵃ for the passage of fluid from the opening 48 to the passage 38 and groove 35, or hole or bore 35ᵃ of the embodiment shown in Fig. 7 of the drawings.

The valve means 47 has a body portion 49 having annular grooves 50 adjacent to the openings 48ᵃ and is provided with a substantially semi-elliptical or bullet-shaped head 51 extending within the bore 48 and spaced therefrom to provide an annular orifice 52 with the bore 48 and at the inner end of the shank 44 adjacent the openings 48ᵃ. The valve is provided with a collar 53 which is adapted to abut the stop means 46 for positioning the head 51 within the bore 48 and determining the annular orifice 52.

For normally seating and maintaining the collar 53 seated with the stop means 46, a coiled spring 54 is provided having an end thereof abutting the collar, while the other end is within and abuts the end of a bore 55 in the shank 56 of a plug 57 which is mounted in the bore 40. Each of these plugs 57 is provided with a head 58 which is adapted to contact the bulbous end 34 of the arm 7. The plug 57 of the plunger head 33 is pressed into the bore 40 thereof, while the other plug 57 is slidably mounted within the bore 40 of the plunger head 32 and is adapted to bear against a spring 59 within the bore, this spring being of sufficient resiliency to react against the plug and provide a clearance between the head 58 of this plug and the end of the plunger head. An end of the spring 59 abuts the shank 44 of the plug 41, the other end thereof adapted to press against the end of the shank 56 for maintaining the contact relation of the plugs and bulbous end and to compensate for wear therebetween. The plug 41 at each end of the plunger 4 is provided with a slot 41$^a$ adapted to receive a screw driver, the slot of the plug 41 in the plunger head 33 being accessible by way of an opening 41$^b$ in the cylinder head 2$^a$. This opening has threaded therein a plug or filler cap 41$^c$ which when removed permits the insertion of a screw driver or, if desired, provides a means whereby the cylinders may be refilled with a fluidal body. The plug 41 may be screwed into or out of the head for compressing or releasing the compression of the spring 54 for varying the force exerted against the collar 53 of the valve 47 for resistance to flow of the fluid through the orifice means 52. The plug is held in any of its adjusted positions by means of an arm 59$^a$ of an angular bracket 60 connected by any suitable means such as a screw 61 to the end of the head, this arm engaging a serration on the head 42 of the plug 41.

Normally the collar 53 abuts the stop 46 for maintaining a given annular orifice between the head 51 and bore 48 and the plug 41 may be adjusted for compressing the spring 54 such that a given resisting force may be applied to the valve 47 for a given resistance to flow of the fluid through the orifice. If the pressure of the fluid passing through the orifice 52 exceeds the force exerted by the spring 54 which resists movement of the valve 47, the valve will move to provide an orifice of a greater area and to vary the flow through the orifice for relieving the excessive pressures.

The head 51 of both of the valves carried in the head portions of the plunger may be of the same size and shape such that the orifice determined thereby may be of equal area for the equal rate of flow of fluid in opposite directions when the plunger is reciprocated within the cylinders. In the drawings, the valves are shown as being of equal size such that the annular orifices are of equal area and for the equal rate of flow of the fluid in either direction of movement of the plunger 4. If, however, it is desired to effect an increase or decrease in the rate of flow of the fluid in one direction, as for instance into the cylinder 3 upon movement of the plunger 4 to the left as viewed in Fig. 2 of the drawings, the valve 70 carried in the plunger head 32 may be replaced by a similar valve having either a smaller or larger head for either increasing or decreasing the area of the annular orifice. By the proper substitution of valves in either or both of the throttling means carried in the heads 32 and 33 any ratio between the rates of flow of the fluid in opposite directions may be had.

A variation in the rates of flow of the fluid in opposite directions may also be effected by the proper adjustment of the plugs 41 in the plunger heads 32 and 33. If valves having heads of equal size were provided in each of the throttling means carried by the plunger heads 32 and 33 respectively and the plugs were so adjusted to equally compress the springs of each throttling means, the rates of flow of the fluid in opposite directions would be equal and the valves would be moved by equal excessive pressures occurring in either of the cylinders 2 or 3 upon movement of the plunger. Now, if the spring of one of the throttling means is released from its former position by the proper adjustment of the plug thereof, the resistance of the valve to flow of the fluid through the orifice means is accordingly decreased and the valve will move to provide a larger orifice means to permit increase flow therethrough, while the resistance to flow of the other throttling means will be maintained and will relieve excessive pressures, as determined by the initial setting of the spring therein. By the proper adjustment of the plugs, when valves of equal size are used, variations in the relative rates of flow of the fluid in opposite directions may be obtained, as likewise a variation in the relative excessive pressures relieved in the cylinders.

Any desired relation between the rates of flow in opposite directions as furthermore the variation in the relative excessive pressures to be relieved in the cylinders may be effected by either the selection and substitution of suitable valves in the throttling means or by the proper adjustment of the plugs thereof, or both.

Each of the plunger heads are provided with a passage 62 communicating with the groove 35 or hole or bore 35$^a$ of the plunger shown in Fig. 7 of the drawings, and in which is a ball 63 for closing this passage to flow of the fluid when the same is being throttled and is passing through the orifice means adjacent thereto, but which permits free flow of the fluid when the fluid is being throttled and is passing through the orifice means carried by the opposite plunger head. This ball is retained within the passage 62 by means of a pin 64 passing through the passage and engaged by the walls thereof.

Each of the plunger heads are further provided with a passage 65 having a ball 66 therein and which is held in place by a pin 67 for the passage of fluid to the cylinders 2 and 3 which may have leaked around the heads and cylinders and into the space within the housing or casing 1 and within the space between these heads and for preventing the formation of a vacuum in the cylinders upon movement of the plunger.

Figure 6:
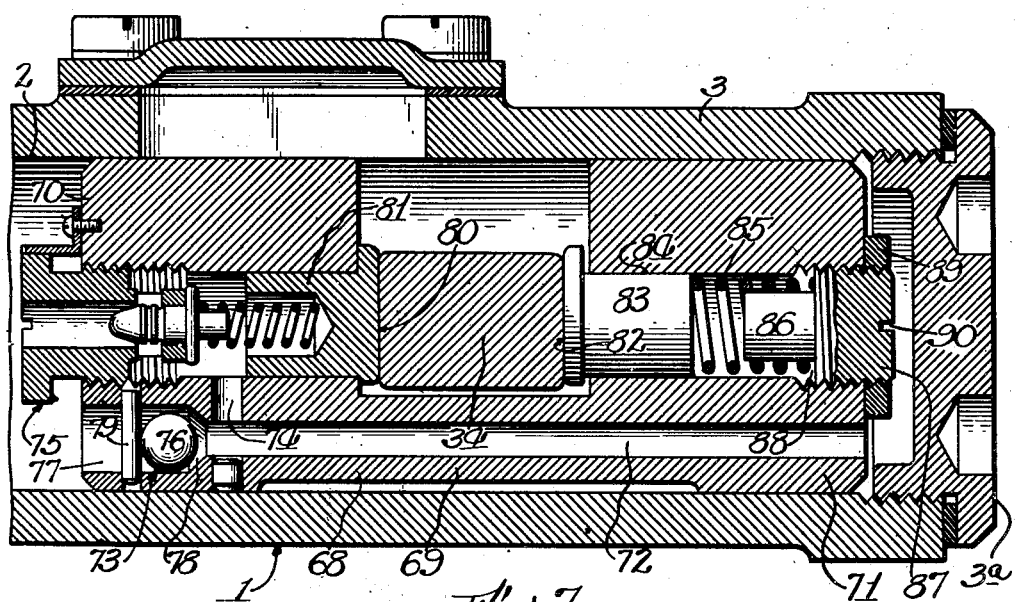
Fig. 6 is a fragmentary horizontal cross-sectional view of a cylinder of a shock absorber showing an alternative plunger construction therein.

In Fig. 6 of the drawings is shown a shock absorber having a casing or housing 1 similar to the casing or housing 1 of Fig. 2 and being provided with cylinders 2 and 3 closed at the ends thereof by a cylinder head such as 3ᵃ. Mounted in these cylinders 2 and 3 is a plunger 68 of somewhat similar construction to the plunger 4 disclosed in the remaining figures of the drawings. This plunger is similarly engaged by the bulbous end 34 of an arm of a shaft similarly mounted in the housing and rockable or movable by an arm 17 for movement of the plunger in the cylinders 2 and 3 for the transfer of oil or other like or similar fluid from one part of the casing or housing 1 and for absorbing and cushioning the movement of the plunger.

The plunger 68 is provided with a body portion 69 having integral with its ends head portions 70 and 71 of substantially the same construction as shown in the other figures of the drawings. This plunger has a longitudinal passage means such as a bore or hole 72 passing therethrough for the transfer of a fluidal body from one cylinder to another upon movement of the plunger, the passage having a throttling means 73 at the end thereof and in the head 70 and further communicating by way of a passage means 74, with a throttling means 75 likewise positioned in the head 70 of the plunger. The throttling means 75 is similar to the throttling means 39 of the previously disclosed plunger 4 and is provided with means for throttling the fluid and embodies the control and relief principles thereof for determining the relative rates of flow or relative resistances to flow of the fluid in its passage from cylinder 2 to cylinder 3, as likewise for relieving excessive pressures occurring in the cylinder 2 upon movement of the plunger 68 in the housing 1. This throttling means further is provided with adjustable means for adjusting and varying the rate of flow or resistances to flow of the fluid therethrough and to determine the pressures to be relieved in the cylinder 2, this adjustable means being accessible by way of an opening 41ᵇ in the closure cap or cylinder head 2ᵃ (not shown). All of the above features of this throttling means 75 correspond with the throttling means 39 as shown in the remaining figures of the drawings.

The throttling means 73 is provided in the head 70 of the plunger for throttling the flow or passage of fluid through the passage means 72 upon movement of the plunger in an opposite direction. This throttling means 73 comprises a ball 76 within a bore or passage 77 which communicates with the passage 72, this passage being of a greater diameter than the ball 76 to provide an annular orifice 78 between the walls thereof and the surface of the ball. When this throttling means operates to throttle fluid passing through the passage 72, the ball 76 is held in place by a pin 79 passing transversely across the bore and engaged by the walls thereof, whereas when the fluid is being throttled by the throttling means 39 this ball seats against the end of the walls of the bore adjacent the passage 72 for preventing flow or passage of the fluid therearound. The throttling of the fluid passing through this throttling means may be varied by varying the size of the ball 76 or the diameter of the bore or passage 77 such that by the substitution of balls of known diameter within a bore 77 of given diameter, any desired throttling of the fluid may be effected.

Any desired ratio between the relative rates of flow or the relative resistances to flow of the fluid upon movement of the plunger in opposite directions may be obtained by proper adjustment and selection of the valve means in the throttling means 75 as heretofore described and by the selection of a suitable size ball 76 or diameter of bore 77 of the throttling means 73.

The bulbous end 34 of the extending arm is in contact with the head 80 of a plug 81 which is pressed into the bore of the plunger head 70 and is further in contact with the head 82 of a plug 83 slidably fitted or mounted in a bore 84 of the plunger head 71. For maintaining this contact relation between these plugs and the bulbous end 34 and to compensate for wear, a coil spring 85 having sufficient resiliency to provide a clearance between the head 82 of the plug 83 and the end of the plunger head 71 is provided within the bore 84 one end of which bears against the end of the plug 83 while the other end encircles the extending portion 86 of a plug 87 provided with a shoulder 88 against which the other end of the spring abuts. This plug is screwed into the threaded end of the bore 84 and is provided with a lock nut 89 at its outer end, this plug having a slot 90 adapted to receive a screw driver for screwing the same into or out of the end of the bore for adjustment of the plug 83.

Each of the heads of the plunger shown in the present embodiment is provided with passages and valve means similar to the passages 65 and balls 66 respectively for passage of fluid which may have leaked into the space in the housing or casing 1 between the plunger heads to the cylinders 2 and 3 and for preventing the formation of a vacuum or partial vacuum in the cylinders upon movement of the plunger.

The device operates in the following manner: When the road wheels of the vehicle, not shown in the present drawings, strike an obstruction in the roadway, the axle, not shown, but to which the arm 17 of the shock absorber is connected, will be moved upwardly, causing said arm 17 to be operated in a counterclockwise direction as regards Fig. 2, thereby causing the arm 7 to be operated in a similar direction. This results in the movement of the plunger toward the right as regards Fig. 2, and fluid between the cylinder head 3ᵃ and the plunger head portion 4 will be compressed. Fluid will now flow through the throttling means 39, which includes the bullet-shaped head 51 of the valve 49, thence through passage 38 into the groove 35 from whence said fluid will flow through the passage corresponding to passage 62 at the opposite end of the plunger into the space adjacent the cylinder head 2ᵃ. Under ordinary conditions, that is movement of the piston in response to small obstructions being met, pressures within the right end of the cylinder as regards Fig. 2 will be properly taken care of without movement of the valve 49, however, if such pressures become excessive due to the striking of comparatively large obstructions in the highway, then the valve 49 will be moved against the effect of the spring 54 to enlarge the orifice provided between the bullet-shaped head 51 of the valve and the passage presented by the throttling means 39.

In the rebound movement of the shock absorber, that is when the axle is moved downwardly away from the car body by the vehicle springs, arms 17 and 7 will be moved clockwise as regards Fig. 2 and thus the plunger will be moved toward the left of the cylinder, or more specifically toward the cylinder head 2ᵃ. The fluid pressure in this end of the cylinder is controlled by valve mechanism in the plunger similar to that described heretofore, and therefore no detailed description of this control mechanism will be made.

As mentioned heretofore, passage 65 with valves 66 provided thereon are adapted to replenish any fluid losses within the cylinders due to leaks past the pistons.

While I have herein described and upon the drawings shown an illustrative embodiment of the invention, it is to be understood that the latter is not limited thereto, but comprehends other details, arrangements of parts, features and constructions without departing from the spirit thereof.

Having thus disclosed the invention,

I claim:

1. A shock absorber comprising a cylinder, a plunger reciprocable in said cylinder, said plunger having head portions held in spaced relation by an integral web portion, and throttling means in said head portions providing constantly open orifices for throttling of fluid upon movement of said plunger in opposite directions in said cylinder within a predetermined range of fluid pressures, said throttling means being adapted, in response to pressures in excess of said predetermined range of pressures, to increase their orifices.

2. A shock absorber comprising a cylinder, a plunger reciprocable in said cylinder, said plunger having head portions held in spaced relation by an integral web portion, throttling means in said head portions providing initially open fluid flow orifices adapted, in response to predetermined fluid pressures, to be increased in capacity for throttling of fluid upon movement of said plunger in opposite directions in said cylinder, and means associated with said throttling means for determining the resistance to flow of the fluid through said throttling means.

3. A shock absorber comprising a housing for holding a fluid and having a cylinder, a plunger in said cylinder, said plunger having head portions, a reciprocating member in said housing and extending between said head portions, means carried by said head portions for throttling fluid upon movement of said plunger in said cylinder in opposite directions said means comprising stationary and movable members, and means provided in one of said head portions and cooperating with the stationary members of the aforementioned throttling means for maintaining contact relation between said member and head portions.

4. In a shock absorber having a cylinder and a reciprocating member, a plunger movable in said cylinder and actuated by said member, said plunger having passage means for passage of fluid from one part of said cylinder to another, throttling means comprising a stationary part and a movable member, adjacent the end of said passage means for throttling said fluid upon movement of said plunger in opposite directions, wear pieces carried by the plunger and resilient means interposed between the stationary part of one throttling means and its adjacent wear piece for maintaining contact relation between said wear pieces and reciprocating member.

5. In a shock absorber having a cylinder and a reciprocating member, a plunger movable in said cylinder and actuated by said member, said plunger having a passage means for transfer of fluid from one part of said cylinder to another, oppositely disposed wear pieces carried by the plunger, throttling means in said passage means for throttling of fluid upon movement of said plunger in opposite directions, adjustable means associated with said throttling means for determining the resistance to flow of fluid therethrough, and resilient means provided between an adjustable means of a throttling means and the adjacent wear piece for maintaining contact relation between said plunger and the wear pieces.

6. A shock absorber comprising a housing for holding a fluid supply, a reciprocable plunger in said housing, a groove in the surface thereof terminating short of the both ends of the plunger and adapted to act as a passage for the fluid in one or another direction of movement of said plunger, and throttling means carried at each end of said plunger and communicating with said groove.

7. A shock absorber comprising a housing for holding a fluid supply, a reciprocable plunger in said housing, said plunger having head portions tied together by an intermediate, integral web, and a passage in the plunger and communicating with said portions for flow of the fluid in one or another directions of movement of said plunger, and throttling means carried by said head portions and in said passage.

8. A shock absorber comprising a housing for holding a fluid supply, a reciprocable plunger in said housing, said plunger having head portions and an intermediate web portion, a groove in the surface of said intermediate web portion terminating short of the ends of said plunger for passage of fluid between said head portions, a passage in each plunger head portion providing communication between the groove and the end of the respective head portion, and throttling means in said passages.

9. A shock absorber comprising a housing for holding a fluid supply, a reciprocable plunger in said housing, a groove in the surface of the plunger terminating short of the ends of the plunger and adapted to act as a passage for the fluid, a passage in each end of the plunger, communicating with the groove throttling means carried by said plunger and controlling the passages communicating with said groove, and means for determining the relative rates of flow of the fluid through said plunger passages.

10. A shock absorber comprising a housing for holding a fluid supply, a reciprocable plunger in said housing comprising two head portions tied together in spaced relation by an intermediate web portion, a groove in the surface of the plunger web portion terminating short of the ends of the plunger and adapted to act as a passage for the fluid, throttling means carried by each plunger head portion and communicating with said groove, and means for adjusting the relative rates of flow of the fluid through the plunger in opposite directions.

11. A shock absorber comprising a housing for holding a fluid supply, a reciprocable plunger in said housing, a longitudinal passage in said plunger, and means in said passage adapted normally to provide a constantly open, annular orifice means within the passage which, in response to predetermined fluid pressures, is adapted automatically to be increased in size for the proper diffusion of the fluid therethrough, said means comprising a tubular member secured in said passage and slidably supporting a plunger which provides constantly open and increasable orifices between it and the tubular member, and a spring yieldably urging the plunger into normal position.

12. A shock absorber comprising a housing for holding a fluid supply, a reciprocable plunger in said housing, a longitudinal passage in said plunger, a plug carried by said plunger and at each end thereof, said plugs having a bore therein communicating with said passage, means in each of said bores to provide an annular orifice means with the bore for passage of the fluid therethrough.

13. A shock absorber comprising a housing for holding a fluid supply, a reciprocable plunger in said housing, a longitudinal passage in said plunger, a plug carried by said plunger and at each end thereof, said plugs having a bore communicating with said passage, means slidable in each of said bores and spaced therefrom to provide an annular orifice means therewith, and means for normally maintaining a given orifice in each bore for resistance to flow of fluid therethrough.

14. A shock absorber comprising a housing for holding a fluid supply, a reciprocable plunger in said housing, a groove in the surface of said plunger to act as a passage for the fluid, a plug in each end of said plunger and having a bore communicating with said groove, means protruding into and spaced from said bore to provide annular orifices at each end of the plunger, and means for determining the relative rates of flow of a fluid through said orifices.

In witness whereof, I hereunto subscribe my name to this specification.

JAY C. PARSONS.